United States Patent [19]

Bapat et al.

[11] Patent Number: 5,770,897
[45] Date of Patent: Jun. 23, 1998

[54] HYBRID SOLID STATE SWITCH

[75] Inventors: Vinod N. Bapat; John G. Reckleff, both of Raleigh, N.C.; Per A. Danfors, Elm Grove, Wis.

[73] Assignee: ABB Power T&D Company Inc., Raleigh, N.C.

[21] Appl. No.: 714,757

[22] Filed: Sep. 16, 1996

[51] Int. Cl.$^6$ .................................................. H01H 83/00
[52] U.S. Cl. ............................ 307/127; 307/64; 307/70; 307/87; 307/125; 327/2; 327/3; 335/18; 315/194; 318/85; 318/809
[58] Field of Search ............................ 307/127, 125, 307/80, 70, 64, 65, 116, 85, 86, 87; 361/102, 93, 3; 327/3, 2; 335/18; 318/809, 85; 315/194

[56] References Cited

U.S. PATENT DOCUMENTS

| | | | |
|---|---|---|---|
| Re. 28,490 | 7/1975 | Chen et al. | 317/23 |
| 3,601,619 | 8/1971 | Ringstad | 307/87 |
| 3,609,388 | 9/1971 | Hemmenway | 307/87 |
| 3,611,043 | 10/1971 | Steen | 361/102 |
| 3,673,422 | 6/1972 | Parke | 307/87 |
| 3,683,199 | 8/1972 | Billings et al. | 307/87 |
| 3,704,392 | 11/1972 | Chen et al. | 317/23 |
| 3,714,452 | 1/1973 | Williamson | 307/86 |
| 3,748,489 | 7/1973 | South | 307/87 |
| 3,753,002 | 8/1973 | Jacobson et al. | 307/87 |
| 3,864,620 | 2/1975 | Abbondanti | 321/27 R |
| 3,932,764 | 1/1976 | Corey | 307/85 |
| 4,218,625 | 8/1980 | Beckwith et al. | 307/87 |
| 4,256,972 | 3/1981 | Wyatt et al. | 307/68 |
| 4,333,021 | 6/1982 | Cresap et al. | 307/87 |
| 4,405,867 | 9/1983 | Moakler et al. | 307/64 |
| 4,409,491 | 10/1983 | Schott | 307/77 |
| 4,575,671 | 3/1986 | Lee et al. | 322/16 |
| 4,700,256 | 10/1987 | Howell | 361/13 |
| 4,704,652 | 11/1987 | Billings | 361/5 |
| 4,754,161 | 6/1988 | Fox | 307/87 |
| 4,760,483 | 7/1988 | Kugelman et al. | 361/13 |
| 4,797,570 | 1/1989 | Fox | 307/87 |
| 4,811,163 | 3/1989 | Fletcher | 307/64 |
| 4,812,672 | 3/1989 | Cowan et al. | 307/64 |
| 5,081,367 | 1/1992 | Smith et al. | 307/85 |
| 5,138,184 | 8/1992 | Keefe | 307/64 |
| 5,229,908 | 7/1993 | Gurstein et al. | 361/85 |
| 5,243,489 | 9/1993 | Dougherty | 361/93 |
| 5,272,387 | 12/1993 | Fiorina et al. | 307/125 |
| 5,319,514 | 6/1994 | Walsh et al. | 361/59 |

*Primary Examiner*—William M. Shoop, Jr.
*Assistant Examiner*—Albert W. Paladini
*Attorney, Agent, or Firm*—Woodcock Washburn Kurtz Mackiewicz & Norris LLP

[57] ABSTRACT

Methods and apparatus for switching a load between first and second sources is shown to include first and second solid state switches connected to the load. First and second mechanical breakers are connected between the switches and the sources so that each source is connected to the load through a circuit breaker and solid state switch. A controller is connected to sense the voltage from the first and second sources. The controller is connected to the first and second switches and the first and second mechanical breakers. The controller senses the phase difference between the voltages from the first and second sources. The controller causes the first and second mechanical breakers to open and close in response to sensing the phase difference between the sources. The first and second mechanical breakers can include medium voltage vacuum breakers. In a preferred embodiment, when the controller senses that the phase difference between sources is more than 30 degrees out of phase, the controller will open the circuit breaker connected to the alternate source. In this manner voltage stress on the solid state switching devices is minimized.

5 Claims, 2 Drawing Sheets

HYBRID APPROACH USING SOLID-STATE AND MECHANICAL BREAKERS

HYBRID SOLID STATE SWITCH

FIELD OF THE INVENTION

The present invention relates to a silicon transfer switch (STS) for providing an uninterrupted transfer of power between two sources in the event of a voltage sag or disturbance (fault) in one of the power sources or its associated transmission system. More specifically, the present invention relates to a silicon transfer switch having a hybrid arrangement of solid state switching components and mechanical breakers resulting in optimized voltage ratings.

BACKGROUND OF THE INVENTION

Silicon transfer switches or static transfer switches (STS) are known in the art. These switches are designed to provide an uninterrupted AC power source to facilities where any interruption in power could result in significant financial loss, as well as catastrophic human loss. Such facilities include industrial plants that perform continuous manufacturing operations, hospitals, airports, military bases and data communications centers, where an uninterrupted power supply is critical to facility operation.

Generally, the STS device comprises two power source switch boxes, wherein the preferred power source is input into one of the switch boxes and an alternative power source is input into the other switch box. Inside each switch box is an arrangement of solid state switching devices, such as thyristors, with the electrical components of each switch box being connected to controller electronics housed in a controller box (generally positioned between the switch boxes). The solid state switching devices in each box are designed to provide fast transfer of the power service from the preferred power source to the alternative power source in the event of a disturbance or voltage sag.

The controller electronics in the controller box provides the necessary input and output information to turn the switch device in one of the switch boxes to an "on" position, while turning the switch device in the other box to an "off" position so that the power source flowing into the "on" switch is supplied to the load. Typically, transfer from the preferred AC power source to the alternate AC power source will occur within a fraction of a power cycle.

It has been generally accepted that solid state equipment designed using thyristors (SCRs), gate turn-off SCRs (GTOs) and insulated gate bi-polar transistors (IGBTs) need to be rated for worst case steady state as well as transient voltages that are anticipated on the transmission and distribution system. One such equipment scheme, namely, a solid-state sub-cycle static medium voltage load transfer switch is shown in FIG. 1.

As shown, a preferred source is connected to a load via a solid state static switch module 10. Module 10 includes thyristors 12 and 14 connected antiparallel and a transient absorbing device 16. When any voltage disturbance beyond the specified limits is detected on the preferred source, the load is transferred to the alternate source. Such transfer occurs within a portion of a line cycle so that the load function can continue uninterrupted. In such schemes the preferred and alternate sources can become 180 degrees out of phase.

When preferred and alternate sources become 180 degrees out of phase while solid state switch 10 is closed and solid state switch 20 is open, the solid state switch 20 is subjected to a 2 PU (2 per unit or 200% of the rated system voltage) blocking voltage, i.e., twice the expected source voltage. Such a blocking voltage results in substantial design costs and power loss disadvantages for solid state equipment.

Accordingly, a need still exists for apparatus and methods for use in solid state switches which minimizes the design of such switches for worst case steady state ratings as well as for transient voltages.

SUMMARY OF INVENTION

The above described problems are resolved and other advantages are achieved in methods and apparatus for switching a load between first and second sources. Such switching system is shown to include first and second solid state switches connected to a load. First and second mechanical breakers are connected between the switches and the sources so that each source is connected to the load through a circuit breaker and solid state switch. A controller is connected to sense the voltage from the first and second sources. The controller is connected to the first and second switches and the first and second mechanical breakers. The controller senses the phase difference between the voltages from the first and second sources. The controller causes the first and second mechanical breakers to open and close in response to sensing the phase difference between the sources.

The first and second mechanical breakers can include medium voltage vacuum breakers. In a preferred embodiment, when the controller senses that the phase difference between sources is more than 30 degrees out of phase, the controller will open the circuit breaker connected to the alternate source. In this manner voltage stress on the solid state switching devices is minimized.

BRIEF DESCRIPTION OF THE DRAWINGS

The present invention will be better understood, and its numerous objects and advantages will become apparent to those skilled in the art by reference to the following detailed description of the invention when taken in conjunction with the following drawings, in which.

DETAILED DESCRIPTION OF THE INVENTION

Figure 1:
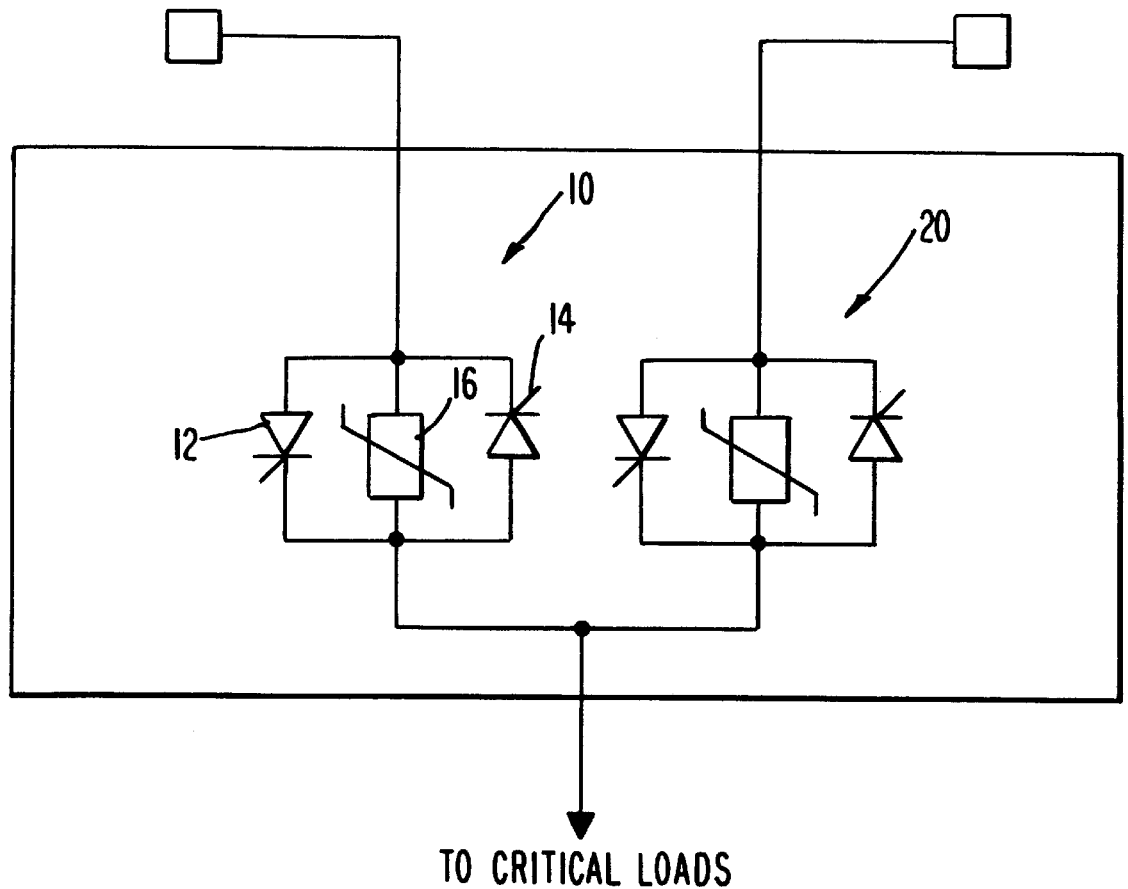
FIG. 1 is a diagrammatic view of a prior art solid state sub-cycle static module transfer switch.
Figure 2:
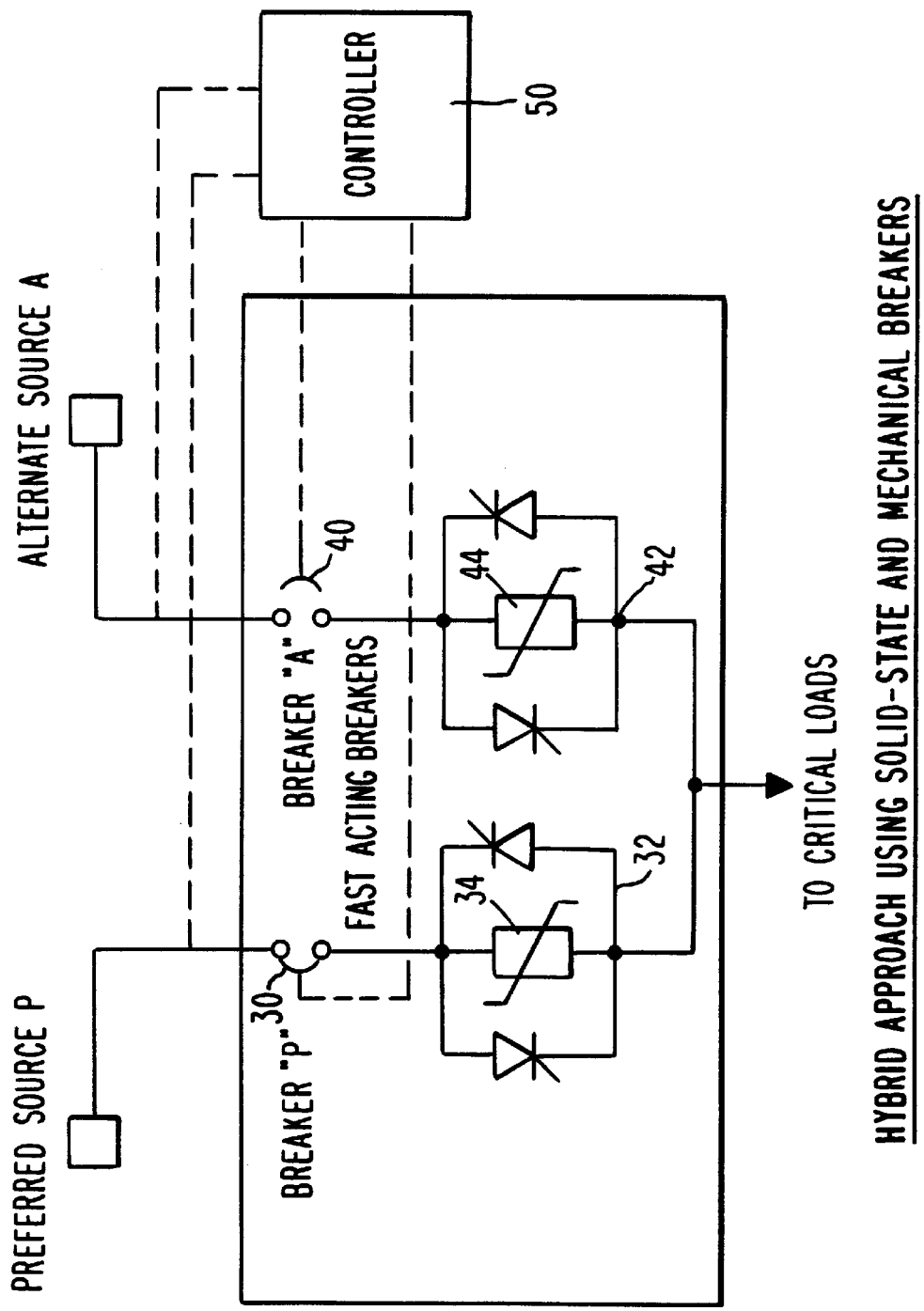
FIG. 2 is a Diagrammatic view of a solid state transfer switch constructed in accordance with the present invention.

Referring to FIG. 2, there are shown two fast acting circuit breakers 30 and 40 connected in series with two solid state transfer switches 32 and 42. A controller 50 is connected to breakers 30 and 40 and connected to switches 32 and 42. Controller 50 is also connected to sense the voltage from source P and source A. Controller 50, which can be of any conventional design, senses the phase angle difference between the source voltages.

During normal operation circuit breaker 40 is closed and switch 42 is open. Should it become necessary to transfer the load, switch 42 would be closed. When controller 50 senses that the phase angle difference between source A and P exceeds and stays beyond a selected value for a selected time period, controller 50 opens circuit breaker 40.

In a preferred embodiment the selected value for angular difference is 30 degrees and the selected time period is approximately 3 system cycles, i.e. on the order of tens of milliseconds.

When circuit breaker 40 is opened, the voltage appearing across switch 42 is completely transferred across the open circuit breaker 40. So long as controller 50 senses that the phase angle difference is beyond the selected limit, breaker 40 is held open. Such an arrangement subjects switch 42 to a maximum voltage stress of only approximately 0.5176 PU instead of the 2 PU voltage stress that would appear of circuit breaker 40 were closed. Such reduced maximum voltage stress reduces the Volt/Ampere rating of switches 32 and 42 from 2 PU to 0.5176 PU. Such reduced rating requirements results in reduced design costs.

It is noted that when considering the switching characteristics of mechanical breakers 30 and 40, it is necessary to consider the absorbing characteristics of transient absorbing devices 34 and 44. For example, if devices 34 and 44 can absorb transients which are within 10 to 15 system cycles, it is necessary for the switching speed of circuit breakers 30 and 40 to also be within this time frame.

While the invention has been described and illustrated with reference to specific embodiments, those skilled in the art will recognize that modification and variations may be made without departing from the principles of the invention as described herein above and set forth in the following claims.

What is claimed is:

1. Switching apparatus for switching a load between first and second sources, wherein said sources generate AC voltage and current, said apparatus comprising:

a first solid state switch connected to said load;

a second solid state switch connected to said load;

a first mechanical breaker connected between said first switch and said first source;

a second mechanical breaker connected between said second switch and said second source; and a controller, connected to said first and second sources and connected to said first and second switches and to said first and second mechanical breakers, wherein said controller operates to open and close said first and second solid state switches and said first and second mechanical breakers to switch said load from said first source to said second source and wherein said controller senses the phase angle difference between the voltage phase angles from said first and second sources, determines when said phase angle difference exceeds a preselected phase angle difference and causes said second mechanical breaker to open in response to said controller determining that said phase angle difference has exceeded said preselected phase angle difference.

2. The switching apparatus of claim 1, wherein said first and second mechanical breakers comprise medium voltage vacuum breakers.

3. The switching apparatus of claim 1, wherein said first and second solid state switches comprise thyristors.

4. The switching apparatus of claim 1, wherein said preselected phase angle difference is 30 degrees.

5. The switching apparatus of claim 1, wherein said controller causes said second mechanical breaker to remain open so long as said controller senses that said phase angle difference exceeds a preselected phase angle difference.

* * * * *